United States Patent Office 3,803,123
Patented Apr. 9, 1974

3,803,123
PROCESS FOR THE PREPARATION OF ACETYL DERIVATIVES OF CARDIAC GLYCOSIDES
Walter Losel and Herbert Merz, Ingelheim am Rhein, Germany, assignors to Boehringer Ingelheim GmbH, Ingelheim am Rhein, Germany
No Drawing. Filed Feb. 18, 1971, Ser. No. 116,646
Claims priority, application Germany, Feb. 5, 1970, P 20 10 422.7; Dec. 23, 1970, P 20 63 305.0
Int. Cl. C07c 173/00
U.S. Cl. 260—210.5      5 Claims

ABSTRACT OF THE DISCLOSURE

A process for selective acetylation of alcoholic groups in the pyranoside moiety of cardiac glycosides, which comprises reacting the glycoside with a tri(lower alkyl) ester of orthoacetic acid, partially hydrolyzing the cyclic orthoacetic acid derivative formed thereby, and optionally acetylating the still free alcoholic groups in the intermediate.

This invention relates to a novel process for the preparation of acetyl derivatives of cardiac glycosides.

The prior art

It has heretofore not been possible to selectively and directly acetylate individual alcoholic groups of the pyranoside moiety of cardiac glycosides, such as proscillaridin. In such cases the conventional acetylation procedures always yielded mixtures of isomeric and polysubstituted acetyl derivatives from which the particularly useful pure compounds could be isolated only by very complicated and costly procedures. For instance, such an uneconomical method for the acylation of proscillaridin is described in West German Offenlegungsschrift, P 19 00 898. While it is possible to increase the yields of the desired acylated compounds by isomerization of the undesired side products, as described in West German patent application P 14 43 134, this procedure has only limited practical application because of its high cost.

Objects of the invention

It is an object of the present invention to provide an economical process for introducing acetyl groups into specific positions of the pyranoside moiety of cardiac glycosides, such as proscillaridin, and digitalis glycosides, such as digitoxin and digoxin, and recovering the pure acetylated product.

Other objects and advantages of the present invention will become apparent as the description thereof proceeds.

The invention

We have discovered that the above objects are achieved by reacting a cardiac glycoside (containing a pyranoside moiety, f.i. a digitoxide or a rhamnoside moiety) with a tri(lower alkyl)ester or orthoacetic acid, and subsequently hydrolyzing the cyclic orthoacetic acid derivative formed thereby. The intermediate cyclic orthoacetic acid derivative may, if desired, be isolated and/or further acetylated at any still free alcoholic groups on the pyranoside moiety prior to the hydrolysis.

The process according to the present invention makes it possible to recover virtually quantitative yields of isomer-free α-acetyl derivatives of digitalis glycosides; in the case of proscillaridin, the process of the invention produces high yields of pure 2'-acetyl-proscillaridin and, upon further acetylation of the still free alcoholic group in the 4'-position of the intermediate cyclic 2',3'-orthocarboxylic acid ester with a reactive acetyl derivative in conventional manner, 2',4'-diacetyl-proscillaridin.

The reaction between the starting glycoside and the tri(lower alkyl)ester of orthoacetic acid is carried out in the presence of an acid catalyst and optionally in the presence of an inert organic solvent, such as tetrahydrofuran, dioxane, chloroform or methylene chloride. Suitable acid catalyst are strong inorganic or strong organic acids, such as hydrohalic acid, sulfuric acid, p-toluenesulfonic acid, methane sulfonic acid or trichloroacetic acid; Lewis acids, such as potassium acid sulfate, zinc chloride, borontrifluoride etherate or copper sulfate; and synthetic acid ionexchangers, such as Amberlite IR 120 or Dowex 50. The reaction is performed at a temperature between 0° C. and the reflux temperature of the reaction mixture, but preferably at approximately room temperature.

The intermediate cyclic orthoacetic acid ester formed by the reaction may, if desired, be isolated prior to the partial hydrolysis step; in that case the intermediate is again taken up in an inert organic solvent, such as ethyl acetate, and then partially hydrolyzed with an aqueous acid to form the 2-acetylated proscillaridin or the α-acetyl derivative of the digitalis glycoside. However, we have found it to be more advantageous not to isolate the intermediate and instead to add an aqueous acid to the reaction mixture resulting from the ester exchange reaction between the glycoside and the orthoacetic acid ester, and perform the partial hydrolysis in situ. The aqueous acid may be any desired aqueous acid solution having a pH of 4 or less.

The following examples further illustrate the present invention and will enable others skilled in the art to understand it more completely. It should be understood, however, that the invention is not limited solely to the particular examples given below.

EXAMPLE 1

2'-acetyl-proscillaridin A

A mixture consisting of 2 gm. of proscillaridin A [14 hydroxy - 3β - (1-rhamnosyloxy)bufa-4,20,22-trienolide], 50 ml. of absolute tetrahydrofuran, 1 ml. of triethyl orthoacetate and 50 mgm. of p-toluenesulfonic acid was stirred for one hour at room temperature. Thereafter, the resulting reaction solution was neutralized by addition of triethylamine, and then the tetrahydrofuran was evaporated in vacuo on a water bath at 50° C. The residue was taken up in 100 ml. of chloroform, the resulting solution was admixed with 50 ml. of 0.1 N sulfuric acid, and the mixture was shaken for about 10 minutes with a mechanical shaker. Thereafter, the aqueous phase was separated and extracted twice more with chloroform. The combined organic extract solutions were washed twice with water, dried over anhydrous sodium sulfate and evaporated in vacuo on a water bath at 50° C. The foamy residue was dissolved in as little hot chloroform as necessary, and the resulting solution was diluted with an equal volume of ethyl acetate and then, while gently warming it, admixed with petroleum ether until it just began to turn cloudy. The crystalline precipitate formed thereby was collected, yielding 1.90 gm. (88% of theory) of 2'-acetyl-proscillaridin A, M.P. 235–237° C., of the formula

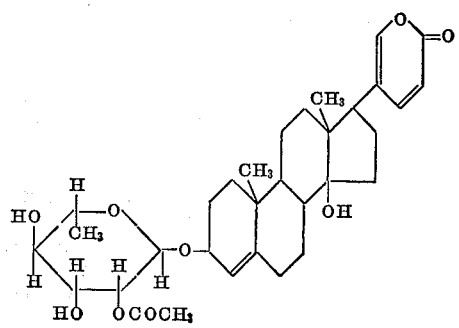

EXAMPLE 2

2'-acetyl-proscillaridin A

A mixture consisting of 2 gm. of proscillaridin A, 150 ml. of absolute dioxane, 200 mgm. of anhydrous p-toluenesulfonic acid and 2 ml. of triethyl orthoacetate was stirred for about one hour at room temperature. Thereafter, for partial hydrolysis of the cyclic orthoester, the reaction solution was admixed with 2 ml. of water and then stirred for about one hour more. Subsequently, the solution was neutralized with triethylamine, evaporated in vacuo on a water bath at 50° C., the residue was taken up in ethyl acetate, the resulting solution was washed with water, and the organic phase was dried over anhydrous sodium sulfate and evaporated in vacuo at 50° C. The residue was crystallized from chloroform/ethylacetate with petroleum ether, as described in Example 1, yielding 1.85 gm. (86% of theory) of 2'-acetyl proscillaridin A, M.P. 235–237° C.

EXAMPLE 3

2',4'-diacetyl-proscillaridin A

A mixture consisting of 2 gm. of proscillaridin A, 50 ml. af absolute tetrahydrofuran, 1 ml. of triethyl orthoacetate and 50 mgm. of p-toluenesulfonic acid was stirred for one hour at room temperature. Thereafter, the reaction solution was neutralized with triethylamine, and then the tetrahydrofuran was evaporated in vacuo at 50° C. The residue was dissolved in 30 ml. of absolute pyridine, 2 ml. of acetic acid anhydride were added, and the mixture was allowed to stand overnight at room temperature. Thereafter, 5 ml. of ethanol were added, the excess acetic acid anhydride was decomposed, and the solution was evaporated in vacuo. The residue was dissolved in ethyl acetate, the resulting solution was shaken several times with 2 N sulfuric acid, and the organic phase was washed twice with water, dried over anhydrous sodium sulfate and evaporated, leaving 1.98 gm. (85% of theory) of a solid, amorphous residue which did not have a sharply defined melting point. It was identified to be 2',4'-diacetyl-proscillaridin A of the formula

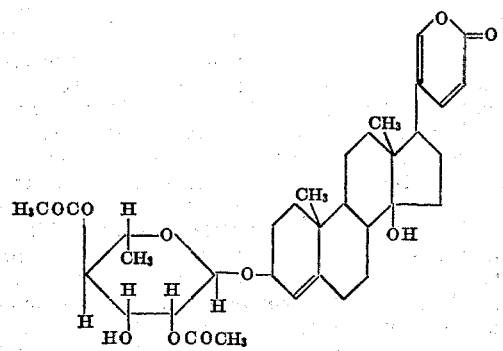

NMR-spectrum (determined in CCl₃):
O-acetyl groups at
  $\tau = 7.88$ (singulett, 3 protons) Δ4'-O-acetyl; and
  $\tau = 7.82$ (singulett, 3 protons) Δ2'-O-acetyl.
(Standard: TMS $\tau = 10.00$ p.p.m.)

EXAMPLE 4

α-Acetyldigitoxin 1 gm. of digitoxin was dissolved in 30 ml. of absolute tetrahydrofuran, the solution was admixed with 1 ml. of triethyl orthoacetate and 100 ml. of p-toluenesulfonic acid, and the mixture was stirred for 90 minutes at room temperature. Thereafter, the reaction solution was neutralized with triethylamine and then evaporated in vacuo at 50° C., the residue was taken up in ethyl acetate, the resulting solution was extracted once with water, twice with 0.2 N hydrochloric acid and once again with water, dried over sodium sulfate, and the solvent was evaporated in vacuo at 50° C. The residue was digested with ether, separated by vacuum filtration and recrystallized from chloroform/ether, yielding 1.1 gm. of α-acetyldigitoxin, M.P. 220° C. (decomp.), specific rotation $[\alpha]_D^{20} = +21°$ (c.=1 in methanol).

EXAMPLE 5

α-Acetyldigoxin 4 gm. of digoxin were dissolved in 60 ml. of absolute tetrahydrofuran, the solution was admixed with 2 ml. of triethyl orthoacetate and 200 mgm. of p-toluenesulfonic acid, and the resulting mixture was stirred for 90 minutes at room temperature. Thereafter, 8 ml. of 0.1 N hydrochloric acid were added, and the solution was stirred for 30 minutes more. Subsequently, the pH of the reaction solution was adjusted to 6 with 0.1 N sodium hydroxide, the solution was evaporated to dryness in vacuo at 40° C., and the residue was digested with 20 ml. of a 1:1 mixture of ethanol and ether, separated by vacuum filtration and recrystallized from a 1:5 mixture of dimethylformamide and ether. 3.9 gm. of α-acetyldigoxin, M.P. 230° C. (decomp.), specific rotation $[\alpha]_D^{20} = -21°$ (c.=3 in pyridine) were obtained.

The acetyl derivatives of cardiac glycosides obtained by the process according to the present invention have useful pharmacodynamic properties. More particularly, they exhibit cardiotonic activities in warm-blooded animals and distinguish themselves over the corresponding unacetylated starting glycosides by a significantly more rapid absorption rate.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. The process of preparing a selectively 2'-acetylated derivative of a cardiac glycoside selected from the group consisting of digoxin, digitoxin and proscillaridin A, which consists essentially of the steps of subjecting said glycoside to an ester exchange reaction with triethyl orthoacetate at a temperature between 0° C. and the boiling point of the reaction mixture and in the presence of an acid catalyst, and partially hydrolyzing the reaction product under acid conditions.

2. The process of claim 1, which includes the additional step of acetylating the still free 4'-hydroxyl group of the pyranoside moiety of said ester exchange reaction product with a reactive acetyl derivative prior to said partial hydrolysis, whereby the selectively 2',4'-diacetylated cardiac glycoside is formed.

3. The process according to claim 1, wherein the said ester exchange reaction is carried out in the presence of an inert organic solvent.

4. The process according to claim 1, wherein the reaction product of said ester exchange reaction is isolated, redissolved in an inert organic solvent and hydrolyzed in the resulting solution in the presence of an aqueous acid solution having a pH of about 4 or less.

5. The process according to claim 1, wherein the reaction product of said ester exchange reaction is partially hydrolyzed in situ in the reaction mixture resulting from said ester exchange reaction by adding an aqueous acid solution having a pH of about 4 or less thereto.

References Cited

Griffin et al.: "Tetrahedron Letters," vol. 23, pp. 2301–2313 (1967).

JOHNNIE R. BROWN, Primary Examiner